No. 784,939. PATENTED MAR. 14, 1905.
J. HAMILTON.
BASKET OR OTHER RECEPTACLE.
APPLICATION FILED JULY 18, 1904.
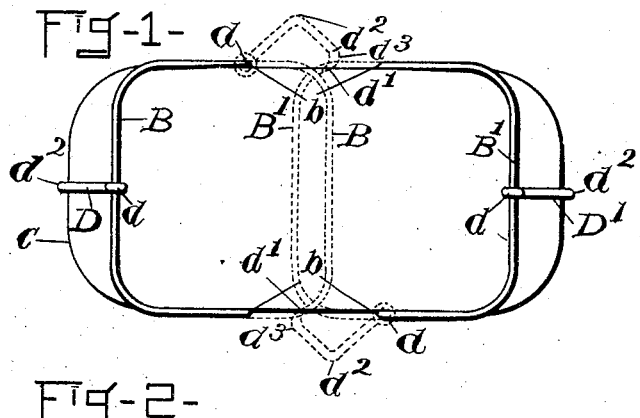
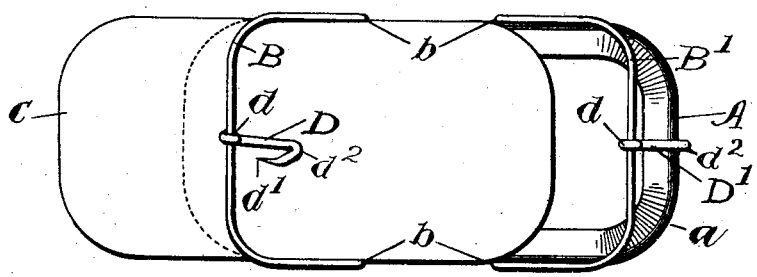
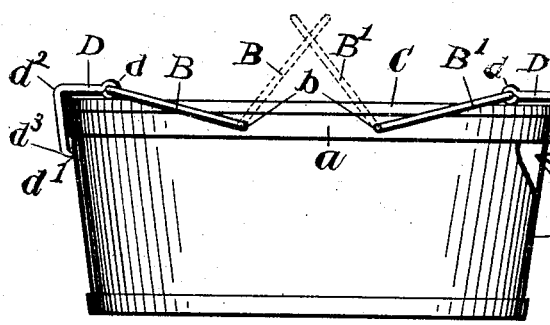 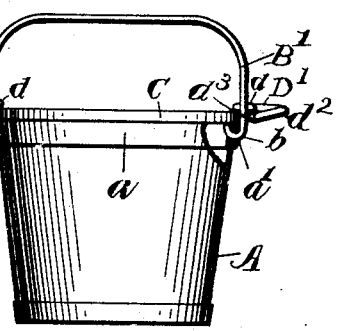
WITNESSES:
Ludger A. Nicol.
Grace Crowley.
INVENTOR:
Joseph Hamilton,
By Albert M. Moore,
His Attorney.

No. 784,939. Patented March 14, 1905.

UNITED STATES PATENT OFFICE.

JOSEPH HAMILTON, OF LOWELL, MASSACHUSETTS.

BASKET OR OTHER RECEPTACLE.

SPECIFICATION forming part of Letters Patent No. 784,939, dated March 14, 1905.

Application filed July 18, 1904. Serial No. 216,972.

*To all whom it may concern:*

Be it known that I, JOSEPH HAMILTON, a citizen of the United States, residing in Lowell, in the county of Middlesex and Commonwealth of Massachusetts, have invented a certain new and useful Improvement in Baskets or other Receptacles, of which the following is a specification.

This invention relates to baskets and other receptacles designed for similar uses, and comprises means hereinafter described for securing a cover on a basket during transportation where a number of such baskets are superimposed and at the same time holding the bails or handles of the basket down upon the cover, the same means also serving to retain the cover on the basket when the handles of the basket are raised to be grasped by the hand.

The basket or other receptacle is provided with two bails or handles pivoted to the basket in the usual manner and adapted to meet or pass each other when raised in a well-known manner. The cover is not attached to the receptacle, but merely rests upon it, and the fasteners are movable on the handle and adapted to engage the end of the receptacle below the cover when the handles are turned down on the basket and to engage the sides of the cover when the handles are raised into a position to be grasped by the hand.

In the accompanying drawings, Figure 1 is a plan of a basket, such as is used for holding small fruits and berries, provided with my improvement with the cover locked in place for packing; Fig. 2, a plan of the same with the cover partly open; Fig. 3, a side elevation of the same with the parts in the same position as in Fig. 1, dotted lines in Figs. 1 and 3 showing the position of the handles or bails when carried in the hand; Fig. 4, an end elevation of the basket with the handles raised, the wall and ring being broken away to show the means of attaching the handles.

A represents a basket of common form, the same being oblong and formed of veneers or splints in any usual manner, the upper edge of the basket-body having the usual ring or reinforce $a$, to which the bails or handles B B' are pivoted in a well-known manner, said bails being yoke-shaped and preferably formed of wire, the ends of each wire being hooked at $b$ through holes $a'$ in the ring $a$, as shown at the right in Fig. 4, where said ring is represented in section as provided with a hole $a'$. The cover C is a thin board corresponding in outline with the top of the basket and resting thereon.

All of the above-mentioned parts may be of the usual construction, and the handles when raised may be swung into contact with each other or one may be passed through the other, as shown in Figs. 1 and 3, and the closed ends of the bails or handles when folded down upon the cover rest upon the same between the ends thereof.

On each handle is arranged a wire hook D D', each hook having an eye $d$, which surrounds the wire of the corresponding handle at one end of said hook, the other end of each hook having a sharp point $d'$.

Each hook is twice bent at $d^2$ $d^3$, so that when the handle is turned down upon the cover the hook will rest upon the cover and pass down outside of the ring $a$ at the end of the basket and under said ring and so that when the point $d'$ is pressed into or through the end wall of the basket the cover will be held down by the handle and will be prevented by the part of the hook between the bends of angles $d^2$ $d^3$ from sliding over the end of the basket. By this means when both hooks are in the position shown in Figs. 1 and 3 in full lines the cover is securely retained on the basket and is prevented from moving laterally by the handles and longitudinally by the hooks. When the handles and the hooks are in this position, a number of baskets may be superimposed.

When one of the hooks D is disengaged from the body of the basket, as indicated in Fig. 2, the cover may be drawn off from the basket endwise to enable the contents of the basket to be inspected.

When both hooks are disengaged from the body of the basket, the handles may be turned up into the position shown in dotted lines in Figs. 1 and 3 to enable both handles to be grasped with one hand, and the points of the hooks may be crowded into the sides of the cover to prevent the cover from slipping off from the basket.

I claim as my invention—

1. The combination of a receptacle-body, a cover adapted to rest thereon, handles pivoted to said body and adapted to be folded down upon said cover between the ends thereof, and fasteners movable on said handles and adapted to reach over the ends of said cover, to engage said receptacle-body when said handles rest upon said cover, and to engage the sides of said cover when said handles are raised.

2. The combination of a receptacle-body, a cover adapted to rest thereon, handles pivoted to said body and adapted to be folded down upon said cover between the ends thereof, and hooks movable on said handles and adapted to reach over the ends of said cover, to engage said receptacle-body when said handles rest upon said cover, and to engage the sides of said cover when said handles are raised.

In testimony whereof I have affixed my signature in presence of two witnesses.

JOSEPH HAMILTON.

Witnesses:
ALBERT M. MOORE,
WILLIAM D. HOBART.